(12) United States Patent
Gordon (10) Patent No.: US 6,337,898 B1
(45) Date of Patent: Jan. 8, 2002

(54) METHOD FOR MONITORING VOICEMAIL CALLS USING ADSI CAPABLE CPE

(75) Inventor: Ian R. Gordon, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/844,840

(22) Filed: Apr. 22, 1997

(51) Int. Cl.[7] .................. H04M 1/64; H04M 11/00; H04M 1/56

(52) U.S. Cl. .................. 379/67.1; 379/70; 379/82; 379/93.23; 379/142.01; 379/373.02

(58) Field of Search .................. 379/67.1, 70, 82, 379/88.01, 88.09, 88.11, 88.17, 88.19, 93.18, 93.23, 93.27, 242, 243, 247, 88.13, 142, 93.25, 93.01, 93.14, 93.17, 34, 35, 38, 142.01, 373.02, 374.01

(56) References Cited

U.S. PATENT DOCUMENTS

| | | | |
|---|---|---|---|
| 5,007,076 A | * 4/1991 | Blakely | 379/67.1 |
| 5,220,599 A | * 6/1993 | Sasano et al. | 379/142 |
| 5,394,461 A | * 2/1995 | Garland | 379/106 |
| 5,400,393 A | * 3/1995 | Knuth et al. | 379/88 |
| 5,416,831 A | * 5/1995 | Chewning, III et al. | 379/96 |
| 5,471,519 A | * 11/1995 | Howe et al. | 379/67 |
| 5,481,594 A | * 1/1996 | Shen et al. | 379/67.1 |
| 5,483,577 A | * 1/1996 | Gulick | 379/67 |
| 5,559,860 A | * 9/1996 | Mizikovsky | 379/58 |
| 5,568,540 A | * 10/1996 | Greco et al. | 379/88 |
| 5,583,922 A | * 12/1996 | Davis et al. | 379/96 |
| 5,615,257 A | * 3/1997 | Pezzullo et al. | 379/396 |
| 5,635,980 A | * 6/1997 | Lin et al. | 348/13 |
| 5,651,054 A | * 7/1997 | Dunn et al. | 379/67 |
| 5,652,789 A | * 7/1997 | Miner et al. | 379/201 |
| 5,737,400 A | * 4/1998 | Bagchi et al. | 375/142 |
| 5,745,553 A | * 4/1998 | Mirville et al. | 379/67 |
| 5,751,793 A | * 5/1998 | Davies et al. | 379/89 |
| 5,796,791 A | * 8/1998 | Polcyn | 379/265 |
| 5,812,647 A | * 9/1998 | Beaumont et al. | 379/111 |
| 5,835,573 A | * 11/1998 | Dee et al. | 379/89 |
| 5,850,435 A | * 12/1998 | Devillier | 379/374 |
| 5,894,504 A | * 4/1999 | Alfred et al. | 379/88.13 |
| 5,901,209 A | * 5/1999 | Tannenbaum et al. | 379/142 |
| 5,937,347 A | * 8/1999 | Gordon | 455/415 |
| 5,987,100 A | * 11/1999 | Fortman et al. | 379/88.14 |

FOREIGN PATENT DOCUMENTS

| | | |
|---|---|---|
| EP | 0844779 | 10/1997 |
| GB | 2290920 | 6/1994 |
| WO | 96/32803 | 10/1996 |

* cited by examiner

Primary Examiner—Allan Hoosain (57) ABSTRACT

A Central Office voicemail system permits a customer to monitor incoming calls and decide whether or not he wishes to take the call. When a call is made to a called party (customer) and the called party does not answer the phone the call is transferred to voicemail in the usual way. Additionally, a special ringing tone is applied automatically by the Central Office to the called party line. This has the effect of alerting the called party to the fact that the caller has been transferred to voicemail. The called party can then monitor the message being left simply by lifting his phone and, if he wants to talk to the caller, he simply carries out a hookswitch flash. Alternatively, with a specially adapted terminal, the called party does not even have to lift the phone to monitor the message because the special ringing tone causes his terminal to go automatically into off-hook hands-free mode.

32 Claims, 8 Drawing Sheets

METHOD FOR MONITORING VOICEMAIL CALLS USING ADSI CAPABLE CPE

FIELD OF THE INVENTION

This invention relates to telephone answering services and particularly to the remote answering services or voicemail offered by the telephone companies.

BACKGROUND OF THE INVENTION

One of the features that telephone companies are attempting to market is Central Office based voicemail, as an alternative to the customer owning an answering machine which would be located in the customer premises. Central Office voicemail has several advantages over customer premise answering equipment. In particular, it is reliable, does not require equipment at the customer's premises and can take messages while the customer is on the phone.

The primary disadvantage is that the Central Office voicemail as it currently exists does not allow incoming call monitoring—i.e., the ability for the customer to allow the answering machine to answer the incoming call and listen to whom is calling and decide if they wish to take the call or not.

International Patent Publication WO96/32803 (Dunn et al) does disclose a technique for monitoring messages being left in a remote voicemail system. However, Dunn et al are concerned with dealing with an incoming call when the called party is already using his telephone to talk to another party. In such a situation the called party is notified of the incoming call by means of a distinctive sound superimposed on the called party's line. The called party then has to carry out a number of specific steps such as putting the party to whom he is already talking on hold and instructing the voicemail system that he wants to monitor the incoming call.

As pointed out by Dunn et al, when the system is implemented by a single communication line to the called party, the system is rather complicated for the called party to operate. To simplify the operation, Dunn et al propose providing a second channel including a personal computer for communication with the voicemail system.

SUMMARY OF THE INVENTION

It is an object of the present invention to provide a system which permits a called party who is not already on the line to monitor a message being left in a remote mailbox.

It is another object of the present invention to provide such a system in which the monitoring is achieved automatically, i.e. without the called party having to carry out any specific operating steps other than decide not to answer the phone.

According to one broad aspect, the present invention provides a remote voicemail system connected to a central telephone switch to which are connected subscriber terminals, the voicemail system comprising:

playback means located at the central switch for playing back pre-recorded messages relating to respective subscribers;

recording means located at the central switch for recording messages from calling parties;

means a t the central switch for connecting to the playback means a call made by a calling party to a called subscriber terminal which has not been answered by the called subscriber after a predetermined time;

means at the central switch for automatically causing a distinctive ringing signal to be sent to the called subscriber terminal on or after connection of the playback means to the calling party's unanswered call; and means at the central switch for establishing a receive path from the calling party to the called subscriber terminal if the called subscriber manually subsequently takes the called subscriber terminal off-hook, whereby a message being recorded by the calling party is relayed automatically in real time to the called subscriber terminal.

According to another broad aspect the present invention provides a remote voicemail system comprising a central telephone switch to which are connected subscriber terminals each having hands-free capability using a hands-free speaker, the voicemail system comprising:

playback means located at the central switch for playing back pre-recorded messages relating to respective subscribers;

recording means located at the central switch for recording messages from calling parties;

means at the central switch for connecting to the playback means a call made by a calling party to a called subscriber terminal which call has not been answered by the called subscriber after a predetermined time;

means for automatically switching the called subscriber terminal to off-hook hands-free mode on or after connection of the playback means to the calling party's unanswered call; and means for establishing a receive path from the calling party to the hands-free speaker of the called subscriber terminal when the called subscriber terminal is in off-hook hands-free mode, whereby a message being recorded by the calling party is relayed automatically in real time to the called subscriber terminal.

The invention in a preferred embodiment makes use of interactive subscriber terminals of the type having a display screen and softkeys which are controlled by management software generated by a remote server.

In December, 1992 an industry-wide standard protocol for Analog Display Services Interface (ADSI) was completed by Bell Communications Research Inc. (Bellcore specifications) to serve as a standard for voice and display (data) information to be transmitted between subscriber display-based terminals and telecommunications switches or servers over the existing copper telephone lines. This standard protocol also defines the formats for the large scrollable displays and softkeys to support new enhanced, interactive, services.

Typical of the interactive subscriber terminals (telephone sets) designed to support the ADSI protocol is the one described in U.S. patent application Ser. No. 354,599 filed on Dec. 13, 1994 in the name of William V. Pezzullo et al and entitled "Screen-Based Telephone Set For Interactive Enhanced Telephony Service". This copending application is incorporated herein by reference.

The subscriber terminal described in the pending application has a relatively large scrollable display and context-sensitive softkeys which enable the terminal to make full use of services typically provided by telephone operating companies, as well as those services provided by enhanced service providers (ESP) delivering third party services and applications through the PSTN (public switched telephone network).

Enhanced service providers (ESPs) are the second major source of ADSI-based services. ESP applications are driven by information downloaded to the terminal from a server—for example, an interactive voice-responsive system located in a bank.

The terminal supports the ADSI protocol which includes the concept of FDM (feature download management) software scripts which can control the display and the softkeys and cause the terminal to go on-hook, off-hook and dial numbers. The terminal also supports an extension to the Bellcore specifications which allows a server to download an FDM script without any intervention by the subscriber. This capability, called Server Initiated Download or ADSI On-Hook Alerting for Automatic Feature Download, requires access to the Tip and Ring of the telephone line connected to the target subscriber terminal while the terminal is on-hook. The downloading of the FDM script is carried out unobtrusively—i.e., without ringing the telephone.

The terminal according to the present invention is an interactive telephone subscriber terminal having a display screen, dial pad and softkeys, the terminal having hands-free capability and being programmed such that on receipt of a standard ringing signal remains on-hook and on receipt of a distinctive ringing signal goes off-hook and activates the hands-free capability.

BRIEF DESCRIPTION OF THE DRAWINGS

Preferred embodiments of this invention will now be described with reference to the attached drawings in which.

DETAILED DESCRIPTIONS OF THE PREFERRED EMBODIMENT

Figure 1:
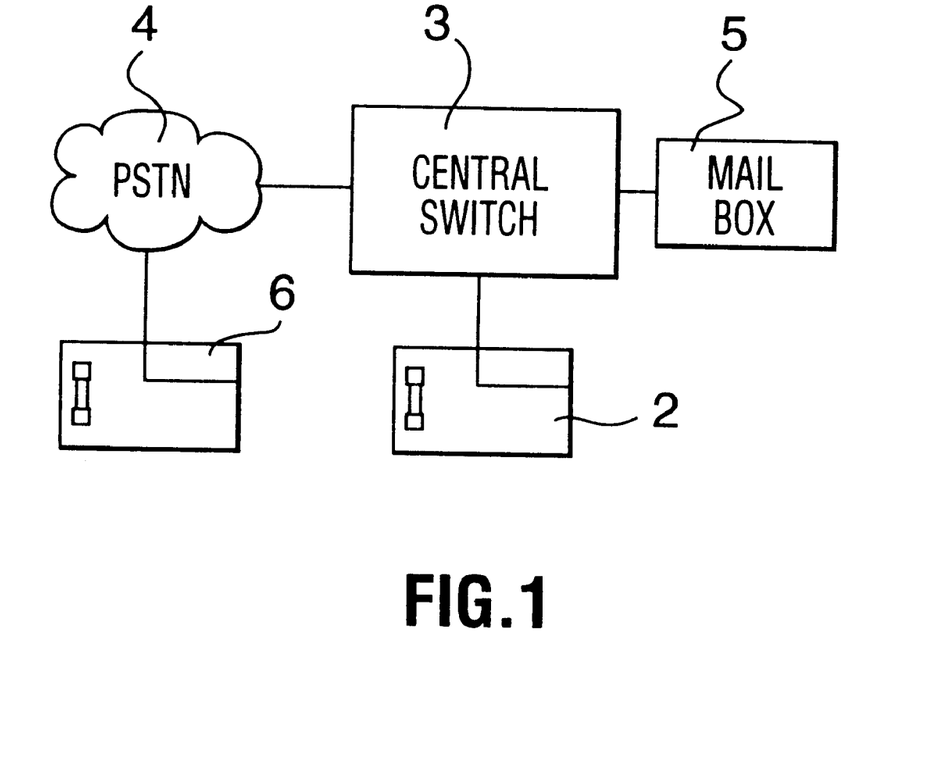
FIG. 1 is a schematic diagram illustrating a remote voicemail system of the type for which the present invention was designed.

FIG. 1 illustrates a voicemail system which comprises a subscriber's telephone terminal 2 connected through a central switch 3 to the PSTN (public switched telephone network) 4. The central switch 3 may be a Central Office switch or a PBX (private branch exchange) switch but in this description it will be assumed that the switch is at the Central Office. A voicemail box 5 is shown schematically as a separate entity connected to the switch 3 but the voicemail box function may be incorporated as a fundamental feature within the switch. Numerous other subscriber terminals represented by terminal are also, of course, connected to the PSTN 4.

Figure 2:
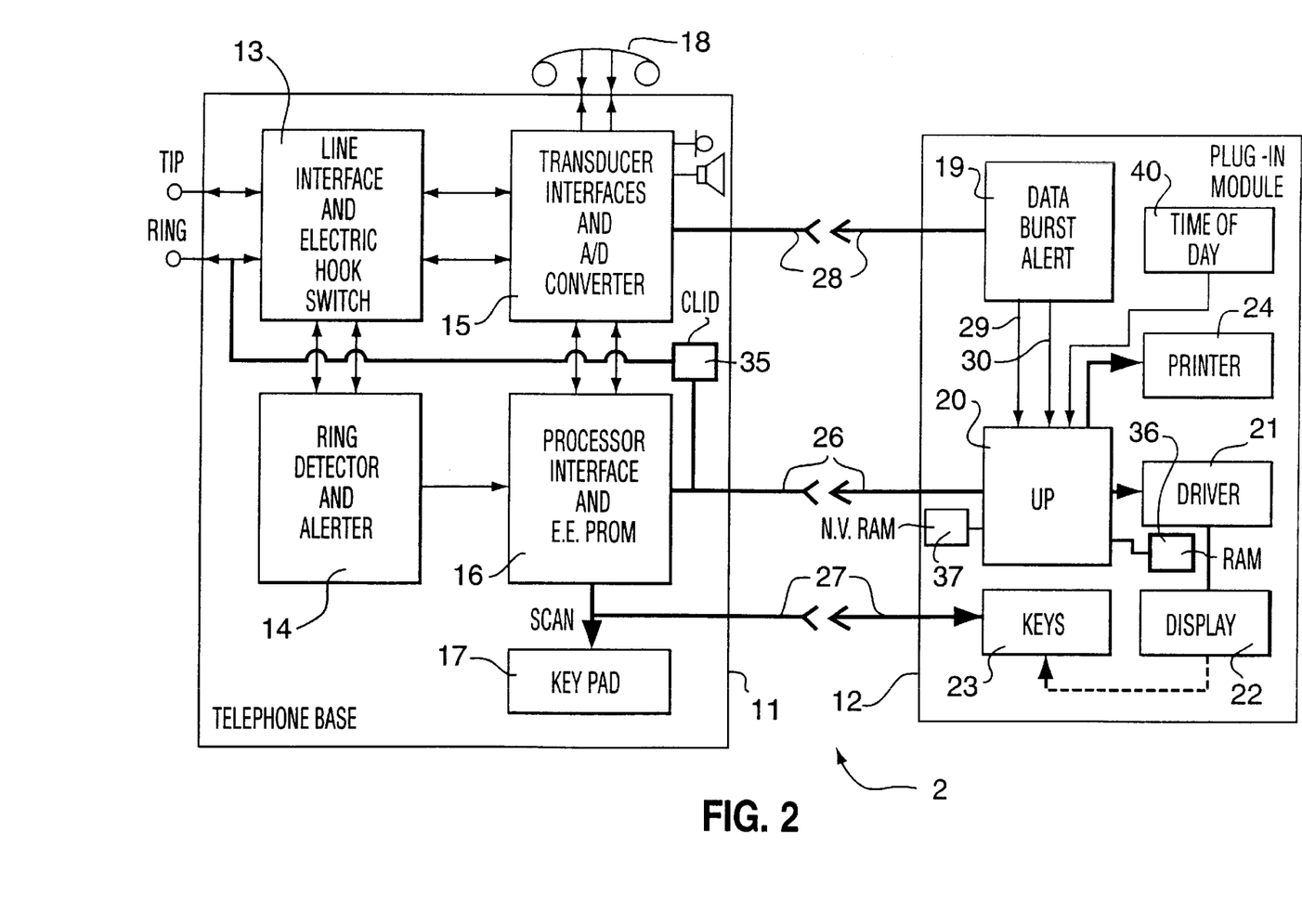
FIG. 2 is a block schematic of an ADSI subscriber terminal for use with the present invention.

The terminal 2 is an ADSI device which, as illustrated in FIG. 2, comprises telephone (or terminal) base 11 and plug-in module 12. The base 11 connects to the Tip and Ring of the telephone line connecting it to the Central Office (CO) switch 3 of the telephone company. The base 11 comprises a line interface and electronic hook switch circuits 13, ring detector and alerter circuits 14, transducer interface and analog-to-digital (A/D) converter circuits 15, processor interface and EEPROM circuits 16, and standard touch-tone telephone keypad 17. A handset 18 is, of course, part of the standard telephone components of the base 11. The ADSI plug-in module 12 comprises a data burst alert circuit 19, a microprocessor 20, an LCD display driver 21, an LCD display 22, softkeys (redefinable keys) 23 adjacent the display 22, and a printer (or printer port for an external printer) 24. Normally, the keys 23 will also include hardkeys such as scrolling cursor keys 25 and so on (as shown in FIG. 2).

Figure 3:
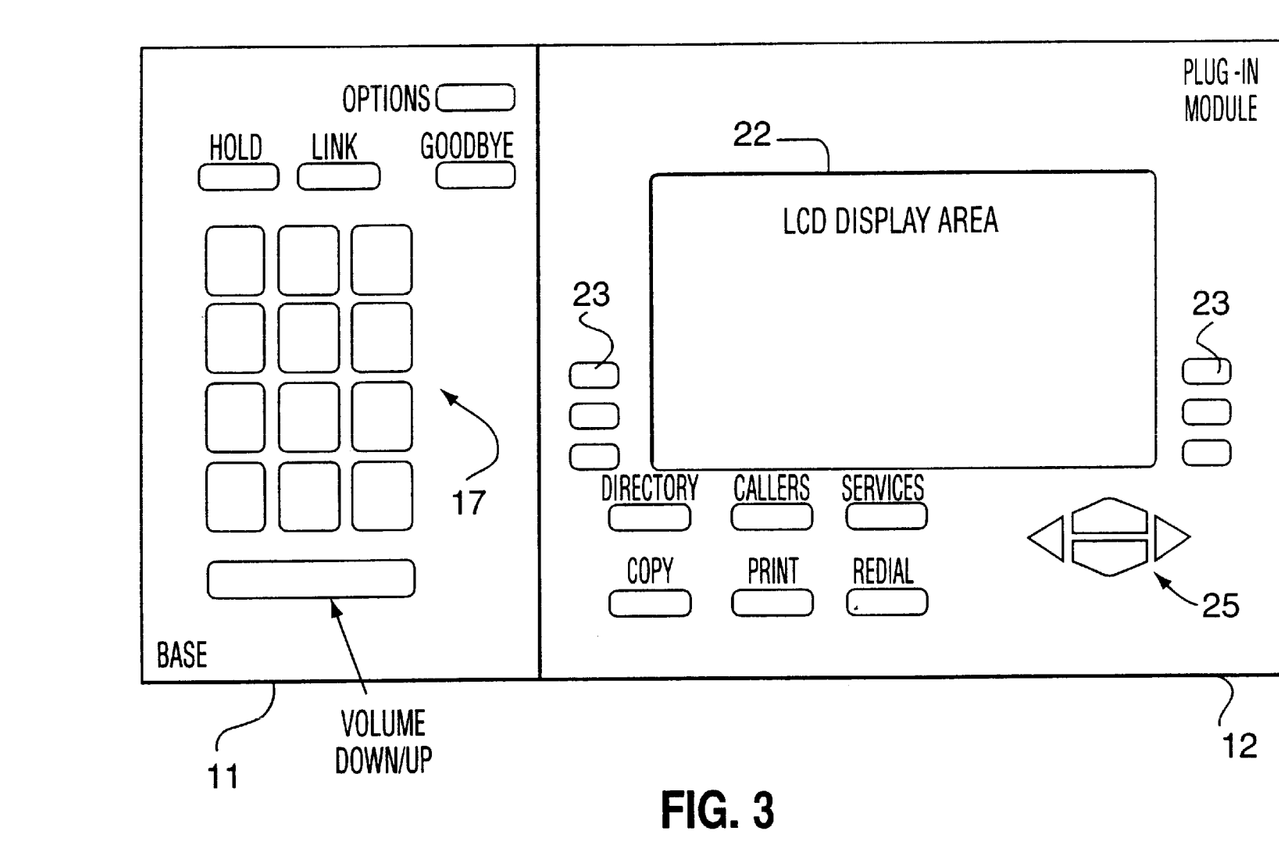
FIG. 3 is a pictorial drawing depicting the front of the subscriber terminal as accessed by a user.

Referring also to FIG. 3, which shows the user-visible front of the ADSI terminal 2, the module 12 plugs into the base 11 and connects to the latter by means of two buses 26 and 27, the former being the processor bus, and the latter for scanning the keys 23. The data burst alert 19, which comprises two switched-capacitor filters for detecting two pre-burst tones, receives signals through the interface 15 via connection 28. The sole function of the alert circuit 19 is to tell the processor 20 by means of high-tone and low-tone leads 29 and 30 that a data burst will follow.

A calling line identifier device (CLID) 35 is also provided in base 11 and a static RAM 36 and a non-volatile random access memory (NVRAM) 37 are provided in module 12 and connected to microprocessor 20.

As described in a copending U.S. patent application entitled "Method for Counting Pay Per Use Feature Activations in CPE" inventor Ian R. Gordon, filed on Dec. 2, 1996, the disclosure of which is incorporated herein by reference, the NVRAM 37 may contain a number of counters, one for each FDM service script, such that the number of different features accessed can be stored by the terminal and communicated to a remote server as desired for billing purposes.

When a Server Initiated Download is instigated a remote server establishes connection through the PSTN with the subscriber terminal without ringing the telephone. This can be achieved as well known in the art by providing specialized connections from the server to the Central Office Switching equipment. Alternatively as described in a copending U.S. patent application entitled "Interactive Subscriber Telephone Terminal with Automatic Management Software Download Feature"inventor Ian R. Gordon, filed on Nov. 6, 1996, the disclosure of which is incorporated herein by reference, Server Initiated Download can be achieved without the specialized connections. More particularly, the NVRAM 37 contains the CLID of one or more servers such that when the server calls up the subscriber terminal, the CLID of the server is compared with the stored CLIDs and if there is a match, the Server Initiated Download protocol is followed.

When connection is thus established between the server and the subscriber terminal, ADSI information (such as application and softkeys definition data) is transmitted to the terminal at a rate of 1200 baud using the same type of signal that provided the calling line ID. The ADSI information can be transmitted as in-band signalling by previously transmitting two tones, 2130 Hz and 2750 Hz, simultaneously for 80 msecs which the data burst alert 19 recognizes as preceding a burst of ADSI information. Thus, the voice paths are muted during data reception to ensure that data is not corrupted and that the user will not hear data being transmitted. The two frequencies chosen can be isolated from voice because they are not among those generated by the dialpad and also do not occur frequently in conversation.

These ADSI signals pass through the Line Interface and Electronic Hookswitch 13, through the Transducer Interfaces and A/D Converter 15 where they are sampled and converted to digital signals by the A/D, through the Processor Interface and EEPROM 16 which further processes the digital samples and then to the microprocessor 20 which is running S/W code contained in built-in masked ROM. The microprocessor 20 decodes the command and takes appropriate action on the RAM 36 contained within the microprocessor block 20. Information to be sent back to the server originates from the microprocessor 20, is sent to the processor interface and EEPROM 16 and is then converted into DTMF (dual tone multi frequency) digits which are converted to analog waveforms by a D/A converter (not shown) in Processor Interface block 16 which are then applied by the Transducer interfaces to Tip and Ring through the Line Interface and Electronic Hookswitch 13.

The ADSI signals which are sent from the server to the subscriber terminal during server Initiated Download are FDM script download commands. The FDM scripts which are stored in NVRAM 37 as a result of the download are software scripts that specify display prompts and specify what the softkey return strings are and also include an event program.

In order to permit a customer to monitor his voicemail service being run at the telephone company Central Office, the software running the voicemail at the Central Office must be modified and operation of the terminal correspondingly adapted.

Figure 4:
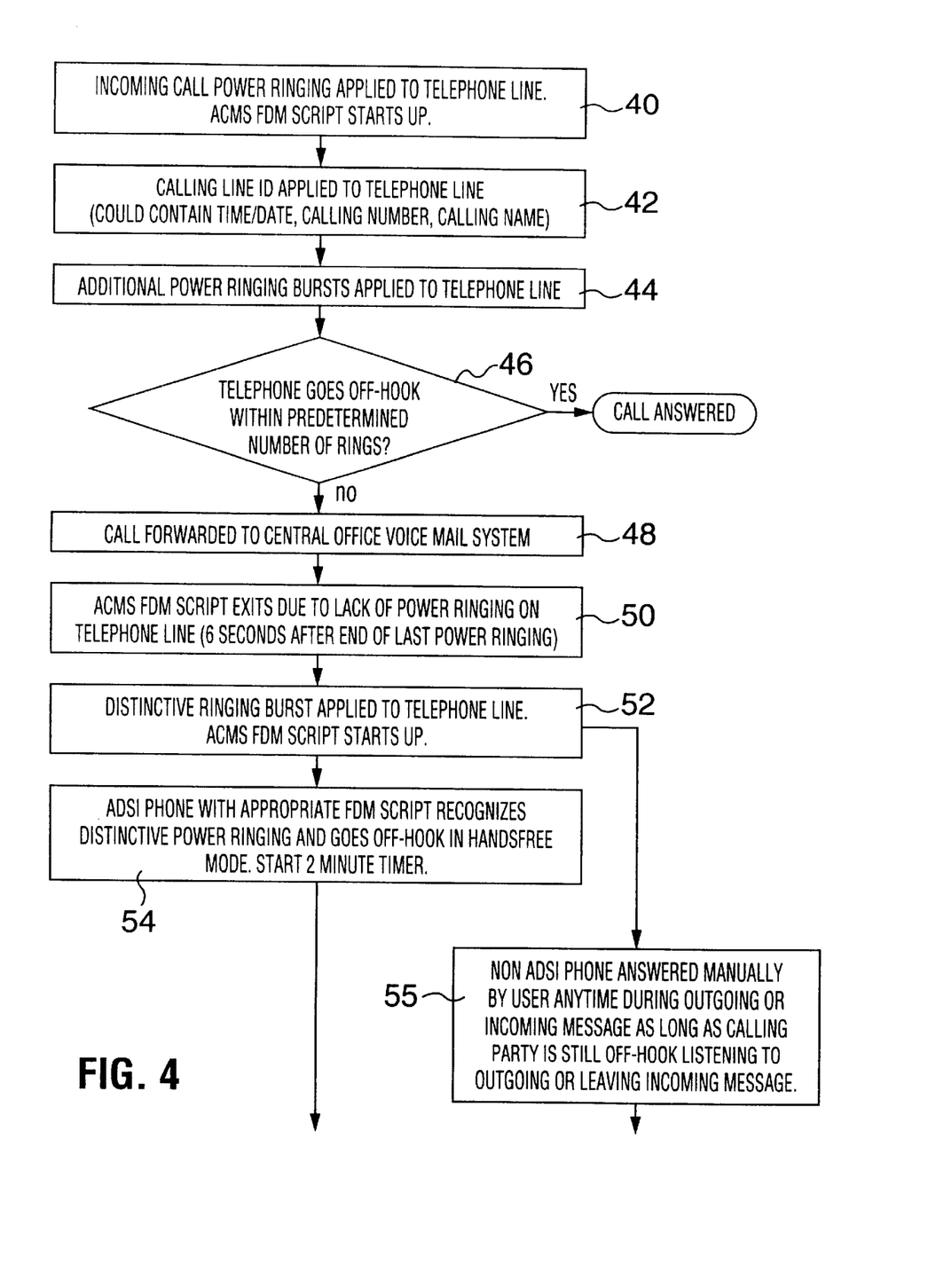
FIG. 4 is a flowchart illustrating the process steps carried out by the system in putting the invention into operation.

FIG. 4 shows the software process steps that are carried out when the Central Office voicemail is monitored according to the invention. In operation, the Central Office switch would handle an incoming call as usual. That is to say, as indicated at block 40, power ringing is applied to the telephone line and an ACMS (advanced call management services) FDM script starts up at the subscriber ADSI terminal. This is a special FDM script that starts up automatically without any user intervention. The next step, as shown in block 42, is to apply the calling line ID to the telephone line together possibly with the time/date, calling number and calling name. Additional power ringing bursts are then applied to the telephone line by the Central Office as indicated at block 44. If the call is not answered before a predetermined number of rings as indicated in block 46, the call is forwarded at 48 to the Central Office voicemail system. After a delay of 6 seconds from the last power ringing the ACMS FDM script running on the subscriber ADSI terminal exits as indicated at block 50.

A distinctive ringing burst is then applied by the Central Office to the telephone line and an ACMS FDM script starts up as indicated at block 52. If the terminal is an ADSI phone with appropriate FDM script it recognizes this distinctive power ringing and goes off-hook in hands free mode. At the same time a 2 minute timer starts—block 54.

If the called party's terminal is not an ADSI capable phone, then his phone will not automatically go into hands-free mode on reception of the distinctive power ringing. However the called party may, on hearing the distinctive ringing indicative of his voicemail being activated, decide to lift the receiver (go off-hook) to monitor his voicemail as indicated in block 55.

As indicated in block 56, the Central Office recognizes that the phone (ADSI or non-ADSI) has gone off-hook and the Central Office software connects the receive path of the terminal to the outgoing pre-recorded message so that the called party as well as the calling party can hear the outgoing message. At the same time the transmit path of the terminal is enabled to the Central Office but not through to the calling party.

The called party may, of course, have an ADSI terminal and a non-ADSI extension. The ADSI terminal will go into hands-free mode as described with reference to block 54 but the called party may be in the room where the non—ADSI extension phone is and elect to lift the receiver of the non-ADSI extension phone in which case block 55 will be carried out in tandem with block 54. In this case, after block 56 is executed, block 57 is executed by the ADSI telephone and the ADSI telephone will go on-hook and exit the FDM script, thereby leaving the called party monitoring the outgoing pre-recorded message on the extension non-ADSI telephone.

Once the outgoing pre-recorded message has finished, as indicated in block 58 the Central Office software then connects the receive path of the called terminal to the incoming message so that the called party can hear the calling party leaving the message. The called party then has the option of taking the call in the ADSI terminal by pressing a TAKE CALL softkey indicated by block 60. Operation of the softkey performs a hookswitch flash to signal the Central Office switch that it should terminate taking the message and should instead connect the transmit and receive paths of the ADSI terminal through to the calling party so that a conversation between the caller and called person can take place as indicated at block 62.

If the called party does not have an ADSI phone he can simply perform a hookswitch flash on his non-ADSI terminal as indicated in block 64 to cause a move to block 62.

If the called party has a non-ADSI extension phone, he would also have the option of taking the call on the non-ADSI extension phone terminal by taking the extension off-hook also as indicated in block 64. The ADSI terminal would recognize that an extension has gone off-hook and generate an EXTENSION IN USE event which would trigger the FDM script to cause the ADSI terminal to go on-hook and exit the FDM script as per block 57. The called party would then perform a hookswitch flash on the extension to cause a move to step 62 in which the extension is now in conversation with the calling party.

If the incoming call is terminated by the calling party going on-hook without the called party taking the call via step 60 or 64, the Central Office applies a 2 second line break to the called party telephone line followed by dial tone as indicated in block 66. The process then steps to block 57 if dial tone detected or Extension in use is detected or the user presses the Quit softkey on the ADSI terminal or if the 2 minute timer expires after going off-hook. In this step the ADSI terminal goes on-hook and exits the FDM script.

Figure 5:
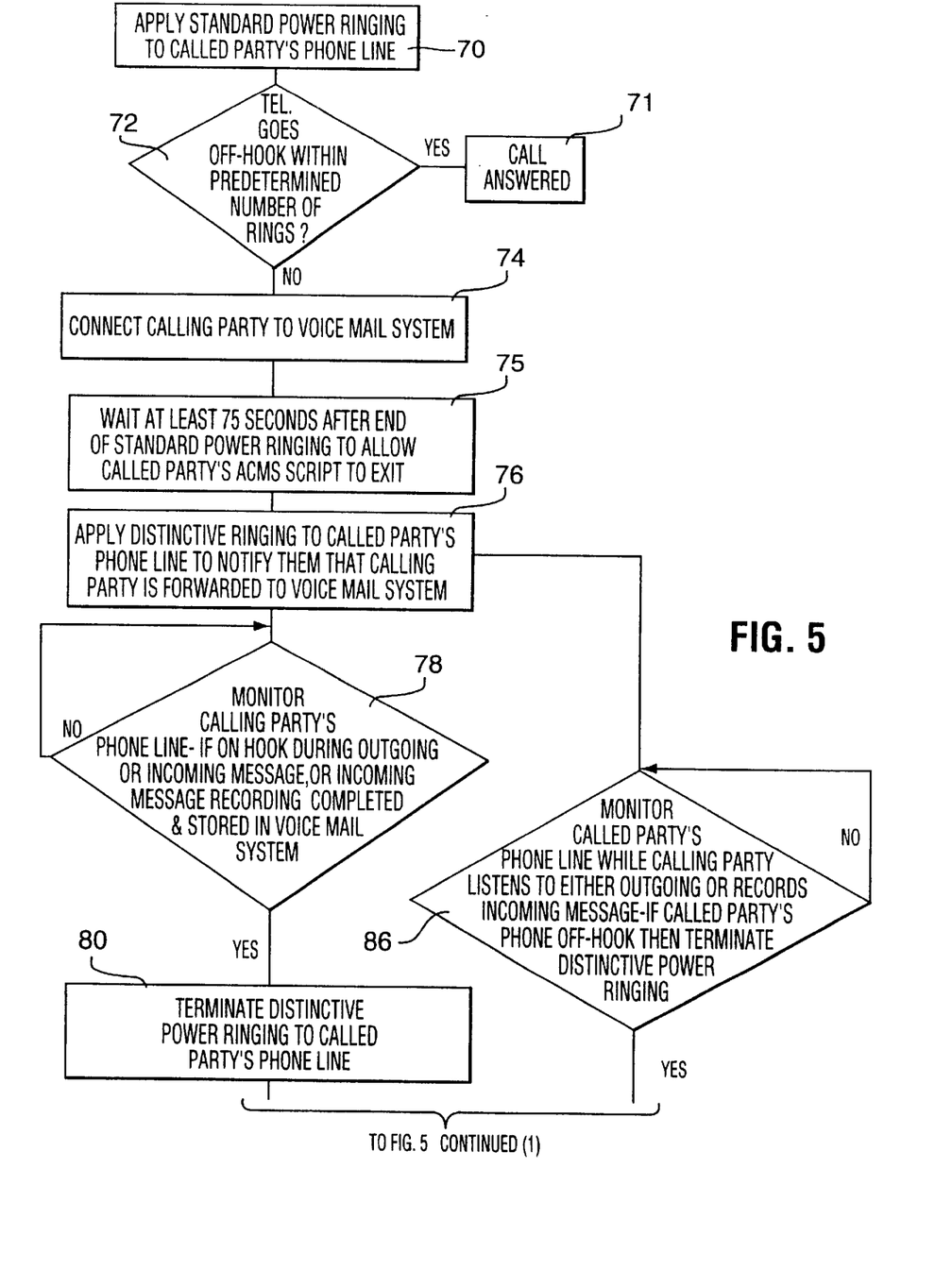
FIG. 5 is a flowchart illustrating the process steps actually carried out by the Central Office software in achieving the invention.

The way in which the software at the Central Office is modified to permit the process steps of FIG. 4 can be understood more particularly by referring to FIG. 5 which is a flowchart of the Central Office software as it relates to the voicemail monitoring. Some of the steps shown in FIG. 5 correspond to steps shown in FIG. 4.

The sequence starts with block 70 which corresponds to block 40 of FIG. 4 and specifies that the Central Office applies a standard power ringing to the called party's line. If the call is not answered within a predetermined number of rings as specified in block 72, which corresponds to block 46 of FIG. 4, then the call is forwarded to the Central Office Voice Mail System as indicated at block 74, which corresponds to block 48 of FIG. 4. The program next steps to block 75 which specifies a 7 second wait after the end of power ringing to allow called party's ACMS script to exit, this corresponding to block 50 of FIG. 4.

The Central Office now applies the distinctive ringing tone as indicated at block 76 which corresponds to block 52 of FIG. 4. The Central Office software then causes monitoring of the calling party's phone line as indicated at block 78. If the calling party goes on-hook during the outgoing or incoming message or the incoming message has been completed, the process steps to block 80 which indicates that power ringing is terminated. If the called party subsequently goes off-hook as indicated at block 82 then the Central Office provides dial tone to the called party as shown at block 84.

While the calling party's line is being monitored at block 78 the called party's line is also being monitored at block 86 to determine whether the called party's line goes off-hook while the calling party is listening to the outgoing message or recording the incoming message. If it does, the process steps to block 88 which specifies that the distinctive ringing tone is terminated and the receive path of the called party is connected either to the receive path of the calling party (to hear the outgoing message) or to the transmit path of the calling party (to listen to the incoming message).

The Central Office then monitors the called party's off-hook phone line while the called party listens to the outgoing or incoming message as indicated at block 90. If a hookswitch flash (which may be followed by a sequence of DTMF digits) or some other signalling mechanism is detected then, as indicated at block 92, the calling party is connected to the called party. Simultaneously, connection between the calling party and the voicemail system is terminated and any portion of the incoming message previously left by the calling party is abandoned (or may be left on the voicemail system at the discretion of the voicemail software) as long as the connection between the calling and called parties is successfully achieved. The call is now treated as a normal phone call as indicated at block 94.

While the monitoring in block 90 is going on a parallel monitoring of the called party's line is proceeding in block 96. If, while the called party is listening to the outgoing or incoming message the called party goes on-hook, this is detected by the Central Office which then disconnects the called party's line from the calling party's line as indicated at block 98. In the next step, block 100, the Central Office detects whether or not there is a subsequent off-hook in the called party line and, if there is, the process steps to block 102 which indicates that the Central Office provides dial tone to the called party's line.

While the monitoring steps 90 and 96 are going on the Central Office is also monitoring the calling party's phone line as indicated at block 104. If the calling party goes on-hook at any time then the process steps to block 106 which indicates that the calling party's connection to the called party is disconnected and the called party is once more provided with dial tone.

The way in which the subscriber terminal is adapted to accommodate the present invention is to include the following event program in the FDM script.

The FDM script program would have the following logic:
Overlay: On-Hook Set
  On Standard Ringing
    Display on Line 1: Incoming Call from:
  On Caller ID
    Display on Line 2: Call Buffer 1
  On Distinctive Ringing
    Set State to 100 (Voicemail Message)
    Go off-hook
    Display on Line 1: Incoming Caller Connected To Voicemail
    Display on Line 2: Press Take Call to talk to Caller
    Display Softkey Take Call
    Display Softkey Quit
  On Extension in Use during State 100 (Voicemail Message)
    Go on-hook
    Exit FDM Script interpreter
  On Dialtone during State 100 (Voicemail Message)
    Go on-hook
    Exit FDM Script Interpreter
  On Timer Expires during State 100 (Voicemail Message)
    Go on-hook
    Exit FDM Script Interpreter
  On Softkey Take Call
    Set State to 4 (Stable 1 Party Call)
    Do Hookswitch Flash
    Display on Line 1: Talking to:
  Go To Overlay: Off-hook Stable Call
  On Softkey Quit
    Go on-hook
    Exit FDM Script Interpreter

What is claimed is:

1. A remote voicemail system comprising a central telephone switch to which are connected subscriber terminals each having hands-free capability using a hands-free speaker, the voicemail system comprising:

playback means located at the central switch for playing back pre-recorded messages relating to respective subscribers;

recording means located at the central switch for recording messages from calling parties;

means at the central switch for connecting to the playback means a call made by a calling party to a called subscriber terminal which call has not been answered by the called subscriber after a predetermined number of rings;

means for automatically switching the called subscriber terminal to off-hook hands-free mode on or after connection of the playback means to the calling party's unanswered call; and means for establishing a receive path from the calling party to the hands-free speaker of the called subscriber terminal when the called subscriber terminal has been switched to off-hook hands-free mode, whereby a message being recorded by the calling party is relayed automatically in real time to the called subscriber terminal.

2. A voicemail system according to claim 1 further comprising selectively operable signal means at the subscriber terminals for enabling the called subscriber selectively to establish a transmit path from the called subscriber terminal to the calling party when the called subscriber terminal is in off-hook hands-free mode.

3. A voicemail system according to claim 1, wherein the means automatically switching the called subscriber terminal to off-hook hands-free mode comprises means at the central switch for sending a special signal to the subscriber terminal and means in the called subscriber terminal for recognizing the special signal and causing the called subscriber terminal to go off-hook.

4. A voicemail system according to claim 3, wherein the special signal is a distinctive ringing signal.

5. A voicemail system according to claim 1, wherein the means for establishing a receive path comprises means at the central switch for recognizing that the called subscriber terminal has gone off-hook.

6. A voicemail system according to claim 2, wherein the means for establishing a receive path comprises means at the central switch for recognizing that the called subscriber terminal has gone off-hook.

7. A voicemail system according to claim 3, wherein the means for establishing a receive path comprises means at the central switch for recognizing that the called subscriber terminal has gone off-hook.

8. A voicemail system according to claim 2, wherein the selectively operable signal means permits selective transmission of a hookswitch flash and the central switch on receipt of the hookswitch flash causes connection of the transmit path.

9. A remote voicemail system comprising a central telephone switch to which are connected subscriber terminals configured according to the ADSI protocol and each having hands-free capability using a hands-free speaker, the voicemail system comprising:
  playback means located at the central switch for playing back pre-recorded messages relating to respective subscribers;
  recording means located at the central switch for recording messages from calling parties;
  means at the central switch for connecting to the playback means a call made by a calling party to a called subscriber terminal which call has not been answered by the called subscriber after a predetermined time;
  means at the central switch for sending a distinctive ringing signal to the called subscriber terminal after connection of the playback means to the calling party's unanswered call;
  the subscriber terminals being configured such that the called subscriber terminal responds to the distinctive ringing signal by placing the called subscriber terminal automatically in an off-hook hands-free mode;
  means at the central switch recognizing that the called subscriber terminal has gone off-hook and in response to such recognition establishes a receive path from the calling party to the hands-free speaker of the called subscriber terminal but not a transmit path from the called subscriber terminal to the calling party, whereby the calling party can be heard at the called subscriber terminal as the calling party is leaving a message but the called subscriber cannot be heard by the calling party.

10. A voicemail system according to claim 9, wherein the subscriber terminals are configured such that pressing of a softkey on the called subscriber terminal by the called subscriber when the called subscriber terminal is on the off-hook hands-free mode causes a hook switch flash and wherein the central switch is configured on receipt of the hookswitch flash to establish the transmit path from the called subscriber terminal to the calling party.

11. A voicemail system according to claim 10, wherein the subscriber terminals have display screens and are configured such that a prompt appears on the display screen of the called subscriber terminal advising the called subscriber which softkey to press to establish the transmit path.

12. An interactive analog telephone subscriber terminal having a display screen, dial pad and softkeys, the interactive analog subscriber terminal having hands-free capability and being programmed such that on receipt of a standard ringing signal it remains on-hook and on receipt of a distinctive ringing signal it goes off-hook and activates the hands-free capability.

13. An interactive analog-telephone subscriber terminal according to claim 12, wherein the terminal is programmed such that on receipt of the standard ringing signal caller ID is displayed on the screen and on receipt of the distinctive ringing signal a message advising that a caller has been connected to voicemail is displayed on the screen and an instruction as to which softkey must be pressed to talk to the caller is displayed on the screen.

14. An interactive analog telephone subscriber terminal according to claim 13, wherein the terminal is programmed to go on-hook if an extension goes off-hook after the terminal has gone off-hook on receipt of the distinctive ringing signal.

15. An interactive analog telephone subscriber terminal according to claim 14, wherein the terminal is programmed:
  to go on-hook if dialtone is received by the terminal after the terminal has gone off-hook on receipt of the distinctive ringing signal; and
  to go on-hook a predetermined time after the terminal has gone off-hook on receipt of the distinctive ringing signal.

16. An interactive analog telephone subscriber terminal according to claim 15, wherein the terminal is programmed such that on pressing of the softkey advised by the instruction displayed on the screen a hookswitch flash is performed by the terminal and the terminal goes to a stable two party call mode.

17. An interactive terminal according to claim 16, wherein the terminal is programmed such that on pressing a Quit softkey the terminal goes on-hook.

18. An interactive analog telephone subscriber terminal according to claim 17, which supports the ADSI protocol.

19. An interactive terminal according to claim 16, which supports the ADSI protocol.

20. An interactive analog telephone subscriber terminal according to claim 13, wherein the terminal is programmed to go on-hook if dialtone is received by the terminal after the terminal has gone off-hook on receipt of the distinctive ringing signal.

21. An interactive analog telephone subscriber terminal according to claim 13, wherein the terminal is programmed to go on-hook a predetermined time after the terminal has gone off-hook on receipt of the distinctive ringing signal.

22. An interactive analog telephone subscriber terminal according to claim 13, wherein the terminal is programmed such that on pressing of the Take Call softkey a hookswitch flash is performed by the terminal and the terminal goes to a stable two party call mode.

23. An interactive terminal according to claim 22, which supports the ADSI protocol.

24. An interactive analog telephone subscriber terminal according to claim 13, wherein the terminal is programmed such that on pressing a Quit softkey the terminal goes on-hook.

25. An interactive terminal according to claim 24, which supports the ADSI protocol.

26. An interactive terminal according to claim 25, which supports the ADSI protocol.

27. An interactive terminal according to claim 13, which supports the ADSI protocol.

28. An interactive analog telephone subscriber terminal according to claim 12, wherein the terminal is programmed to go on-hook if dialtone is received by the terminal after the terminal has gone off-hook on receipt of the distinctive ringing signal.

29. An interactive analog telephone subscriber terminal according to claim 12, wherein the terminal is programmed to go on-hook a predetermined time after the terminal has gone off-hook on receipt of the distinctive ringing signal.

30. An interactive terminal according to claim 12, which supports the ADSI protocol.

31. An interactive analog telephone subscriber terminal according to claim 12, wherein the terminal is programmed to go on-hook if an extension goes off-hook after the terminal has gone off-hook on receipt of the distinctive ringing signal.

32. A method implemented by a telephone service provider for permitting a called subscriber having a subscriber terminal with hands-free capability and a hands-free speaker to monitor a message being left in a remote voice mailbox of the called subscriber, the method comprising the steps of:

receiving an incoming call that is initiated by a caller for the subscriber;

connecting the incoming call to the subscriber terminal;

if the called subscriber does not answer the incoming call after a predetermined number of rings, forwarding the call to a central voicemail system;

playing a recorded message from the central voicemail system to the caller;

switching the called subscriber terminal to off-hook hands-free mode on or after beginning of playing the recorded message;

establishing a receive path from the calling party to the hands-free speaker of the called subscriber terminal when the called subscriber terminal has been switched to off-hook hands-free mode; and recording in the voicemail system a message generated by the caller, which message is relayed automatically in real time to the called subscriber terminal.

* * * * *